United States Patent
Halim et al.

(10) Patent No.: US 11,907,623 B2
(45) Date of Patent: Feb. 20, 2024

(54) CHIP MODULE STRUCTURE AND METHOD AND SYSTEM FOR CHIP MODULE DESIGN USING CHIP-PACKAGE CO-OPTIMIZATION

(71) Applicant: GLOBALFOUNDRIES Dresden Module One Limited Liability Company & Co. KG, Dresden (DE)

(72) Inventors: Saquib B. Halim, Bavaria (DE); Marcel B. Wieland, Radebeul (DE); Frank G. Kuechenmeister, Dresden (DE)

(73) Assignee: GlobalFoundries Dresden Module One Limited Liability Company & Co. KG, Dresden (DE)

( * ) Notice: Subject to any disclaimer, the term of this patent is extended or adjusted under 35 U.S.C. 154(b) by 492 days.

(21) Appl. No.: 17/158,045

(22) Filed: Jan. 26, 2021

(65) Prior Publication Data

US 2022/0237337 A1   Jul. 28, 2022

(51) Int. Cl.
*G06F 30/20*   (2020.01)
*H01Q 1/22*   (2006.01)
(Continued)

(52) U.S. Cl.
CPC .............. *G06F 30/20* (2020.01); *G06F 30/39* (2020.01); *H01L 23/66* (2013.01); *H01Q 1/2283* (2013.01);
(Continued)

(58) Field of Classification Search
CPC ...... G06F 30/20; G06F 30/39; G06F 2113/18; G06F 30/398; H01L 23/66;
(Continued)

(56) References Cited

U.S. PATENT DOCUMENTS 7,023,909 B1   4/2006   Adams et al.
7,138,884 B2   11/2006   Cheung et al.
(Continued)

OTHER PUBLICATIONS

Coilcraft, "Using Baluns and RF Components for Impedance Matching", Wideband Transformers and Inductors, Documents 1077-1, Revised Mar. 27, 2013, pp. 1-2.
(Continued)

*Primary Examiner* — Nha T Nguyen
(74) *Attorney, Agent, or Firm* — Anthony Canale; Hoffman Warnick LLC

(57) ABSTRACT

A chip module, including a radio frequency integrated circuit (RFIC) chip and a package, and a method and system for designing the module. Chip and package design are performed so the RF front end (FE) is split between chip and package. The chip includes an amplifier with a first differential port and the package includes a passive device and matching network with a second differential port connected to the first differential port. The second differential port is power matched to the first differential port using complex power matching based on port voltage reflection coefficients in order to achieve improved performance (i.e., a peak power transfer across a bandwidth as opposed to at only one frequency). The power matching process can result in a chip power requirement reduction that allows for device size scaling. Thus, designing the chip and designing the package is iteratively repeated in a chip-package co-optimization process.

20 Claims, 16 Drawing Sheets

(51) Int. Cl.
*H01L 23/66* (2006.01)
*H03H 7/38* (2006.01)
*H03F 3/45* (2006.01)
*H04B 1/04* (2006.01)
*H03F 1/56* (2006.01)
*H03F 3/193* (2006.01)
*H03F 3/213* (2006.01)
*G06F 30/39* (2020.01)

(52) U.S. Cl.
CPC ............ *H03F 1/565* (2013.01); *H03F 3/193* (2013.01); *H03F 3/213* (2013.01); *H03F 3/45475* (2013.01); *H03H 7/38* (2013.01); *H04B 1/0458* (2013.01)

(58) Field of Classification Search
CPC ..... H01L 2223/6644; H01L 2223/6655; H01L 2223/6661; H01L 2223/6677; H01Q 1/2283; H03F 1/565; H03F 3/193; H03F 3/213; H03F 3/45475; H03F 1/56; H03F 3/195; H03F 3/245; H03F 2200/451; H03H 7/38; H04B 1/0458; H04B 1/40; H04B 1/50
See application file for complete search history.

(56) References Cited

U.S. PATENT DOCUMENTS

| | | | |
|---|---|---|---|
| 7,791,539 B2 | 9/2010 | Soler Castany et al. | |
| 8,232,850 B2* | 7/2012 | Rofougaran | H04B 1/18 333/101 |
| 8,412,290 B2 | 4/2013 | Shamim et al. | |
| 9,391,650 B2 | 7/2016 | Aparin | |
| 2004/0075170 A1* | 4/2004 | Degani | H01L 23/66 257/723 |
| 2014/0009356 A1 | 1/2014 | Sertel et al. | |
| 2014/0361946 A1* | 12/2014 | Ganchrow | H01Q 1/48 343/859 |
| 2020/0225317 A1* | 7/2020 | Chen | G01S 7/417 |
| 2021/0313694 A1* | 10/2021 | Lim | H01Q 5/385 |
| 2022/0052652 A1* | 2/2022 | Jussila | H03F 1/565 |

OTHER PUBLICATIONS

Duo, Xinzhong, "System-on-Package Solutions for Multi-Band RF Front-End", KTH Microelectronics and Information Technology, Doctoral Thesis, Royal Institute of Technology, Laboratory of Electronics & Computer Systems Department of Microelectronics & Information Technology, 2005, pp. 1-88.

Murray, Franck, "Silicon Based System-in-Package: A Passive Integration Technology Combined with Advanced Packaging and System Based Design Tools to Allow a Breakthrough in Miniaturization", IEEE, 2005, pp. 169-173.

Swirhun, Paul, "Millimeter-Wave Circuit Design for Radar Transceivers", Technical Report No. UCB/EECS-2013-192, Electrical Engineering and Computer Sciences, University of California at Berkeley, 2013, pp. 1-86.

Townley et al., "Broadband mm-Wave Transceivers for Sensing and Communication", Technical Report No. UCB/EECS-2020-25, Electrical Engineering and Computer Sciences, University of California at Berkeley, 2020, pp. 1-130.

Watanabe et al., "A Review of 5G Front-End Systems Package Integration", arXiv:2009.07208v1, 2020, pp. 1-15.

Pattnayak et al., "Antenna Design and RF Layout Guidelines," Cypress Semiconductor AN91445, www.cypress.com, published 2015, retrieved from: https://scholar.google.com/scholar?q=Pattnayak+et+al.,+%22Antenna+Design+and+RF+layout+guidelines&hl=en&as_sdt=0&as_vis=1&oi=scholart on Aug. 10, 2023, 60 pages.

* cited by examiner

CHIP MODULE STRUCTURE AND METHOD AND SYSTEM FOR CHIP MODULE DESIGN USING CHIP-PACKAGE CO-OPTIMIZATION

BACKGROUND

Field of the Invention

The present invention relates to chip modules and, more particularly, to embodiments of a chip module structure and to embodiments of a method, a kit, and a system for designing a chip module.

Description of Related Art

A chip module is an electronic assembly. It can include one or more integrated circuit (IC) chips and a package within which the chip(s) are mounted. Package configurations can vary. However, regardless of the configuration, incorporation of a radio frequency (RF) IC chip into a package typically results in chip performance degradation and, particularly, frequency degradation due to various parasitics. Additionally, this frequency degradation is greater in higher operating frequency applications (e.g., in millimeter wave (mmWave) applications and terahertz (THz) applications), which are increasingly in demand by consumers.

SUMMARY

Disclosed herein are embodiments of a method for designing a chip module, which includes at least one radio frequency integrated circuit (RFIC) chip and a package for the RFIC chip. Specifically, the method can include designing a chip. Design of the chip can include design of an on-chip section for the radio frequency front end (RFFE). The on-chip section can specifically include an on-chip amplifier with a first differential port. The method can further include designing a package for the chip. Design of the package can include design of an off-chip section of the RFFE. The off-chip section can specifically include an off-chip passive device and matching network with a second differential port that is to be electrically connected to the first differential port of the on-chip amplifier. Designing the off-chip section of the RFFE can include, for example, accessing design details for the on-chip amplifier and, based on the design details, configuring the off-chip section for the RFFE so that second differential port of the off-chip passive device and matching network is power matched to the first differential port at different frequencies within a given bandwidth.

More specifically, during design of a package for a chip and, particularly, during design of an off-chip section of a RFFE to be included in the package, an off-chip passive device and matching network can be configured based on the results of a complex power matching process that employs port voltage reflection coefficients (as opposed to a standard impedance target) to power match a second differential port of the off-chip passive device and matching network to a first differential port of an on-chip amplifier in an on-chip section of the RFFE at not one, but multiple different frequencies, within a given bandwidth. Additionally, this complex power matching process can result in a reduction in the chip power requirement. Therefore, designing the chip and designing the package can also be iteratively repeated in a chip-package co-optimization process. That is, given the reduction in the chip power requirement achieved through the complex power matching process, the chip can be redesigned to reduce the sizes of on-chip devices (e.g., to reduce transistor size) and thereby to reduce overall chip size. Such a new chip design will come with new port voltage reflection coefficients. Thus, the package can be redesigned in order to again power match the second differential port to the first differential port given the new chip design and, particularly, the new port voltage reflection coefficients, and so on.

Also disclosed herein are embodiments of a system for designing a chip module, which includes at least one radio frequency integrated circuit (RFIC) chip and a package for the RFIC chip. The system can include a processor and also a storage medium, which is readable by the processor and which stores program instructions. These program instructions can be executable by the processor to perform the above-described method.

Finally, also disclosed herein are embodiments of a chip module structure, which is designed according to the above-described method and subsequently manufactured. This chip module structure can include a radio frequency integrated circuit (RFIC) chip. The RFIC chip can include, for the radio frequency front end (RFFE), an on-chip amplifier having a first differential port. The chip module structure can further include a package for the RFIC chip. This package can include, for the RFFE, an off-chip passive device and matching network with a second differential port that is electrically connected to the first differential port of the on-chip amplifier. The off-chip passive device and matching network can be combined in a single device such as a balun. Alternatively, the off-chip passive device and matching network can be discrete electrically connected components (e.g., a transformer and matching network; a phase shifter and matching network; etc.). In any case, the off-chip passive device and matching network can specifically be configured based on a complex power matching process such that the second differential port is power matched to the first differential port at different frequencies within a given bandwidth.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

Figure 1:
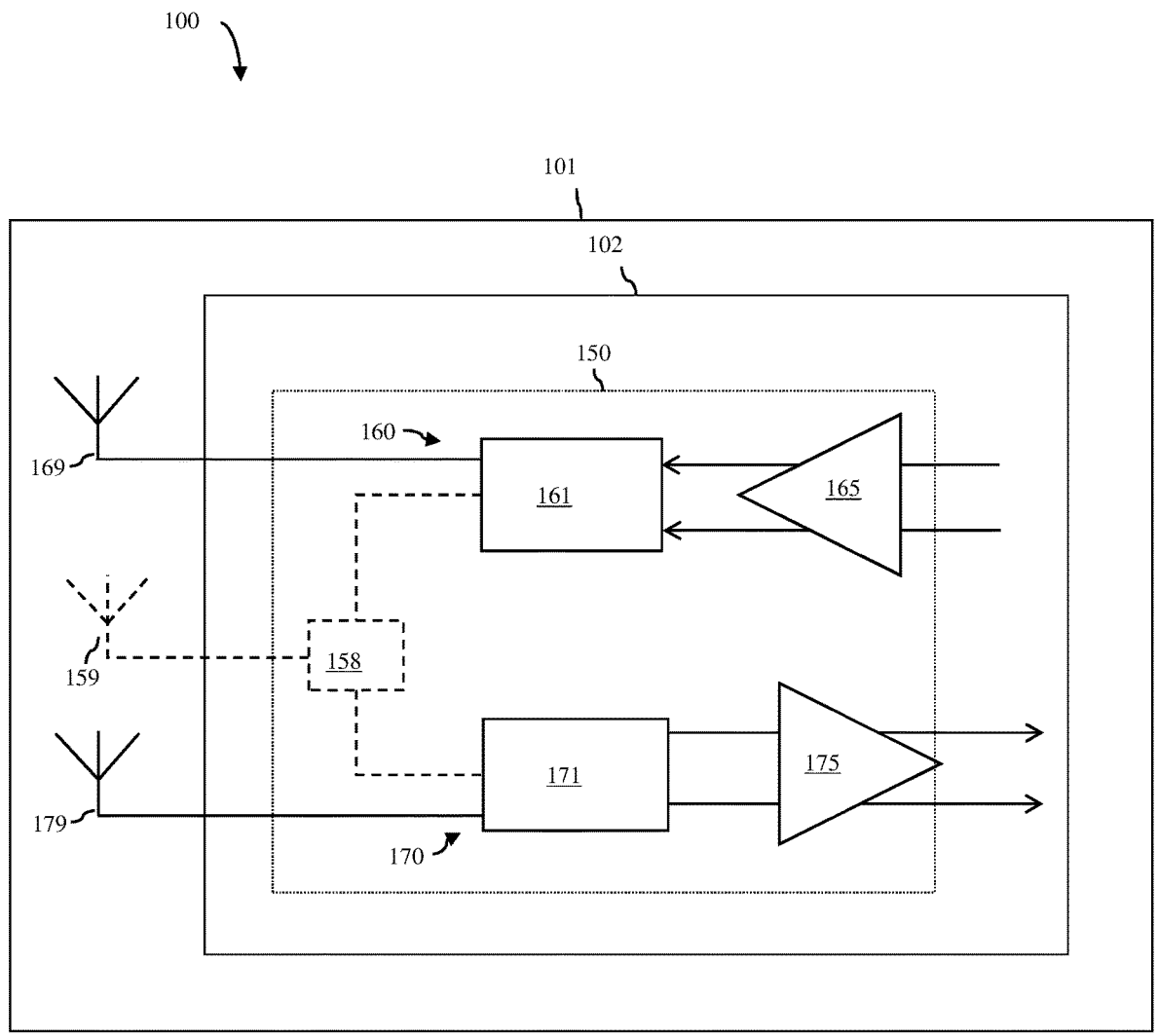
FIG. 1 is a schematic diagram illustrating an exemplary radio frequency (RF) chip module including a radio frequency integrated circuit (RFIC) chip with an on-chip radio frequency front end (RFFE) and a package for the RFIC.

FIG. 1 is a drawing illustrating an exemplary radio frequency (RF) chip module 100. This RF chip module 100 includes one or more RF integrated circuit (IC) chips 102 and a package 101 within which the RFIC chip(s) 102 are mounted. Each RFIC chip 102 can include a radio frequency front end (RFFE) 150 for at least one RF communication device (e.g., for a transmitter, a receiver and/or a transceiver) as well as additional features (not shown). An exemplary RFFE 150 for a transceiver can include, for example, a transmitter (TX) leg 160 and a receiver (RX) leg 170. The TX leg 160 can include, for example, a power amplifier 165 and balun 161 (also referred to herein as a matching transformer), which is connected in series between the power amplifier 165 and a TX antenna 169. The power amplifier 165 can output a differential signal (i.e., a balanced signal) to the balun 161. The balun 161 can convert the received differential signal into an impedance matched single-ended signal (i.e., an impedance matched and unbalanced signal) and can output the impedance matched single-ended output signal for transmission via the TX antenna 169. RX leg 170 can include a low noise amplifier 175 and a balun 171 (also referred to herein as a matching transformer), which is connected in series between an RX antenna 179 and the low noise amplifier 175. The balun 171 can receive a single-ended signal (i.e., an unbalanced signal) from the RX antenna 179, can convert the single-ended signal into an impedance matched differential signal, and can input the impedance matched differential signal to the low noise amplifier 175 for subsequent on-chip processing. As described above, the TX leg 160 and the RX leg 170 each have discrete antennas 169 and 179, respectively. However, it should be understood that, alternatively, the TX leg 160 and the RX leg 170 could be connected to a shared antenna 159 via a switch 158, which is configured to selectively connect either the balun 161 of the TX leg 160 to the shared antenna 159 for transmitting signals or the balun 171 of the RX leg 170 to the shared antenna 159 for receiving signals.

Those skilled in the art will recognize that signal reflections caused by mismatched impedances can cause significant performance degradation. Thus, impedance matching, in the TX leg 160 and RX leg 170, by the baluns 161 and 171 is an important part of RFIC chip design. Typically, in order to simplify impedance matching, RFIC chip designers choose a standard impedance (e.g., of 50 Ohms) and then design the RFFE components (e.g., the power amplifier 165 and balun 161 of the TX leg 160 and the low noise amplifier 175; the balun 171 of the RX leg 170) accordingly. Chip power requirements, on-chip device sizes (e.g., transistors sizes), etc. and thus, performance are impacted by the decision to employ this standard impedance for impedance matching during design. Furthermore, when an RFIC chip 102 is incorporated into a chip module 100, performance degradation and, particularly, frequency degradation will inevitably occur due to various parasitics. This frequency degradation is greater in higher operating frequency applications (e.g., millimeter wave (mmWave) applications and terahertz (THz) applications), which are increasingly in demand by consumers.

Figure 2:
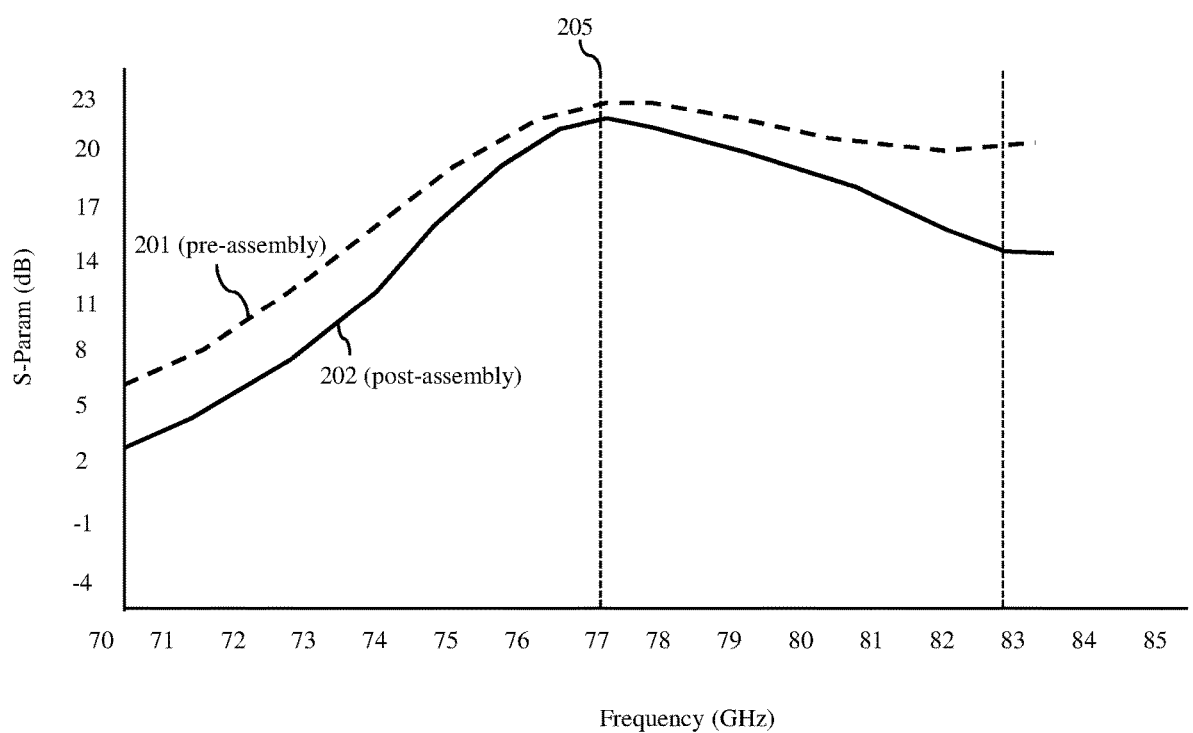
FIG. 2 is a graph illustrating exemplary forward voltage gain (S21) of a differential signal passing from a power amplifier to the balun in the RFFE of FIG. 1 both pre-assembly and post-assembly.

For example, FIG. 2 is a graph illustrating, for the TX leg 160 of a conventional RFFE, exemplary forward voltage gain (S21) of a differential signal passing from the power amplifier 165 to the balun 161 in the RFFE 150 both before package assembly (see curve 201 (pre-assembly)) and after package assembly (see curve 202 (post-assembly)). Due to impedance matching of the power amplifier 165 and balun 161 to a standard impedance (e.g., 50 Ohms), peak 205 power transfer indicated by a forward voltage gain (S21) of 23 dB is achieved at a specific frequency (e.g., at 77 GHz) before package assembly and a peak power transfer of 21 dB is achieved at the same specific frequency after package assembly. However, both pre-assembly and post-assembly, the forward voltage gain (S21) drops below the peak 205 at frequencies both lower and higher than the specific frequency. Furthermore, due to in-package parasitics, the forward voltage gain (S21) drops from the peak 205 at a greater rate after package assembly than it does before package assembly (e.g., see the difference between the forward voltage gain (S21) in curve 201 and the curve 202 at 83 GHz). The same is essentially true for the RX leg 170. That is, due to impedance matching of the low noise amplifier 175 and the balun 171 to the standard impedance, peak power transfer (in this case, reverse voltage gain (S12)) can be achieved at a specific frequency both before and after package assembly. However, the reverse voltage gain (S12) drops at all other frequencies both before package assembly and after package assembly. Furthermore, due to in-package parasitics, the drop in the reverse voltage gain (S12) from the peak is at a greater rate after package assembly than it is before package assembly.

In view of the foregoing, disclosed herein are embodiments of a chip module structure and a method and a system for designing a chip module, which includes at least one radio frequency integrated circuit (RFIC) chip and a package for the RFIC chip. The method and system employ a chip-package co-optimization process in order to, not only avoid chip performance degradation due to package parasitics, but to improve performance and facilitate decreasing chip size. Specifically, in the method and system, chip design and package design are performed so that the radio frequency front end (RFFE) is split between the chip and the package. The chip includes at least one on-chip amplifier (e.g., a power amplifier for a transmitter and/or a low noise amplifier for a receiver), each with a first differential port and the package includes a corresponding off-chip passive device and a matching network (e.g., a balun, a transformer and matching network, a phase shifter and matching network etc.) with a second differential port that is electrically connected to the first differential port. By moving the passive device and matching network of the RFFE from the chip to the package, chip size can be scaled. Furthermore, instead of choose a standard impedance target (e.g., of 50 Ohms) and designing the RFFE components to that match that target, the off-chip passive device and matching network are designed using a complex power matching process. In this complex power matching process, the second differential port of the off-chip passive device and matching network is power matched to the first differential port of the on-chip amplifier based on port voltage reflection coefficients at the first differential port and associated with different frequencies within a given bandwidth (i.e., within a particular broadband). This complex power matching process can be employed to achieve the same peak power transfer for all frequencies within the broadband (i.e., as opposed to a peak power transfer for just one specific frequency). This complex power matching process can also result in a reduction in the chip power requirement. If the chip power requirement is reduced, the sizes of devices (e.g., transistors) within the chip can be scaled. Therefore, designing the chip and designing the package can be an iterative chip-package co-optimization process. That is, given the reduction in the chip power requirement achieved through the complex power matching process, the chip can be redesigned to reduce on-chip device sizes and thereby to reduce the overall chip size. The new chip design will come with new port voltage reflection coefficients at the first differential port for the different frequencies in the broadband. Thus, the package can also be redesigned given the new chip design and, particularly, the new port voltage reflection coefficients, and so on. Also disclosed herein are embodiments of a chip module structure designed using the above-described design embodiments.

Figure 3:
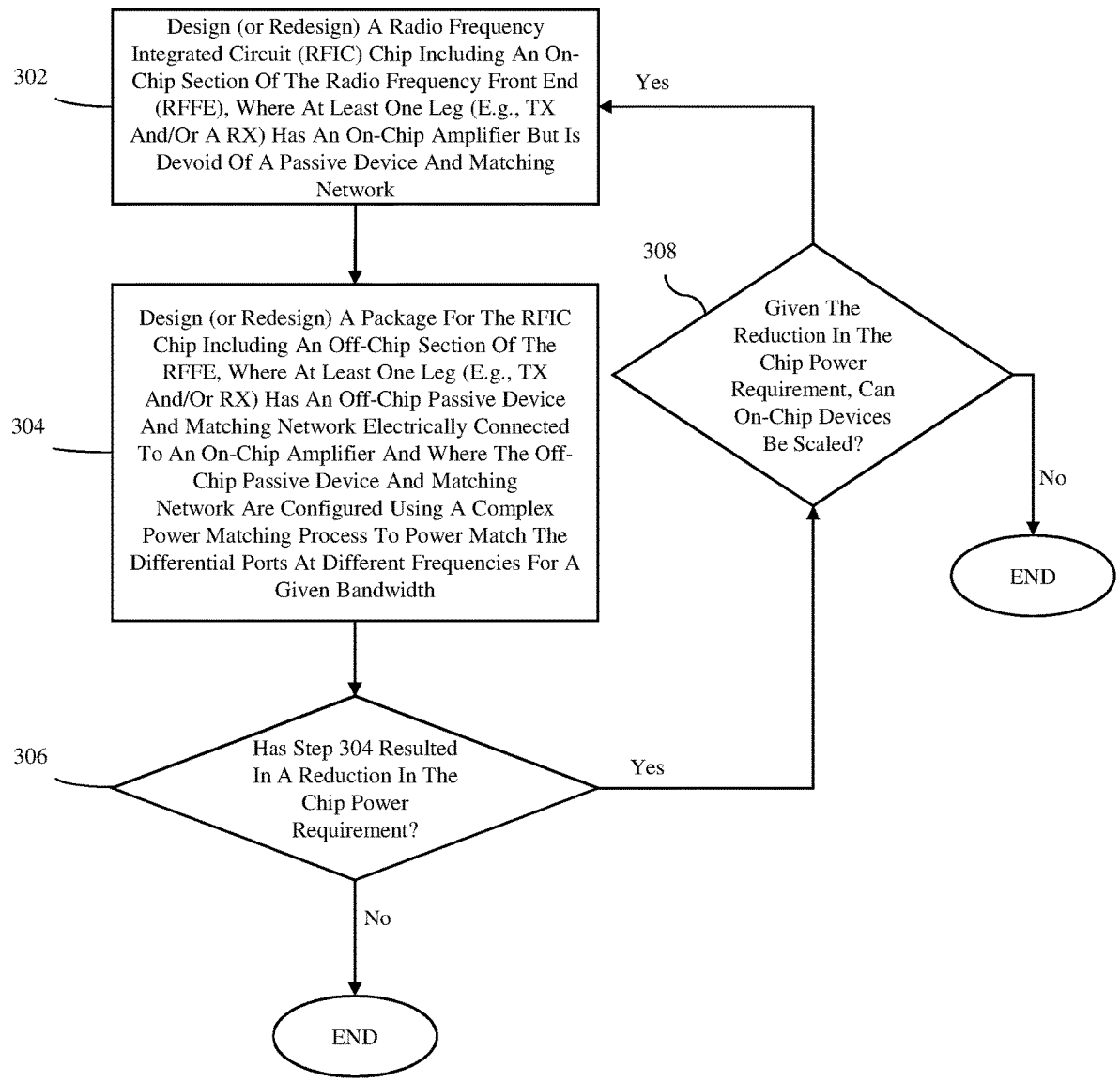
FIG. 3 is a flow diagram illustrating embodiments of a method.

Referring to the flow diagram of FIG. 3, disclosed herein are embodiments of a method for designing a chip module, which includes one or more radio frequency integrated circuit (RFIC) chips and a package for the RFIC chip(s).

Design of the chip module can be implemented using, for example, a process and assembly design kit (PADK) configured for both process design and assembly design (i.e., a design kit that includes both a process design kit (PDK) and an assembly design kit (ADK)). For purposes of this disclosure, a PDK refers to a set of electronic files (including both data and script files), which is developed (e.g., by a semiconductor foundry) for its customers to facilitate design of integrated circuit (IC) chips at a specific technology node supported by the foundry. The electronic files are accessible by one or more electronic design automation (EDA) tools executed on a computer network (e.g., on a computer-aided design (CAD) system) at different stages in the design flow. Exemplary PDK electronic files can include, but are not limited to, simulation models, symbols and technology files for the specific technology node, libraries (e.g., a standard cell library, a parameterized cell (Pcell) library, etc.) and design rule decks, etc. for different stages in the chip design flow (e.g., for floor planning, power planning, input/output pin placement, library element placement, clock planning, wire routing, a layout versus schematic (LVS) check, 3D emulation, simulations, etc.). An ADK refers to a set of electronic files (including both data and script files), which is developed to facilitate design of packaging for such chips. The ADK electronic files can similarly include, but are not limited to, simulation models, symbols and technology files for the specific technology node, libraries, design rule decks, etc. for different stages in the packaging design flow.

Figure 4A:
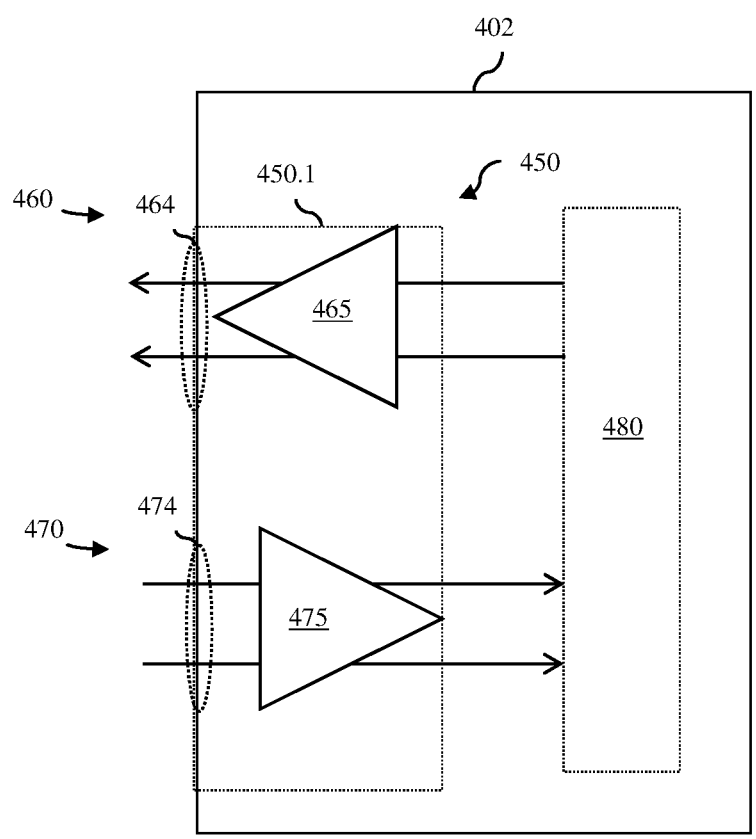
FIGS. 4A-4C are schematic diagrams illustrating alternative RFIC chip designs generated according to the method.
Figure 4B:
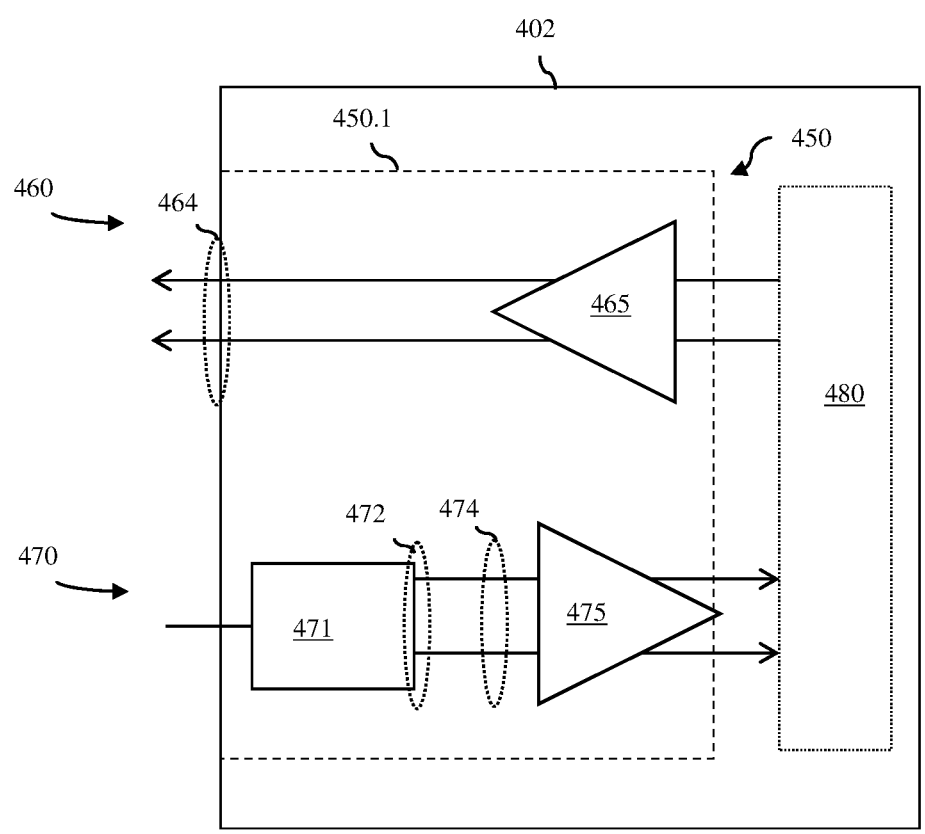
Figure 4C:
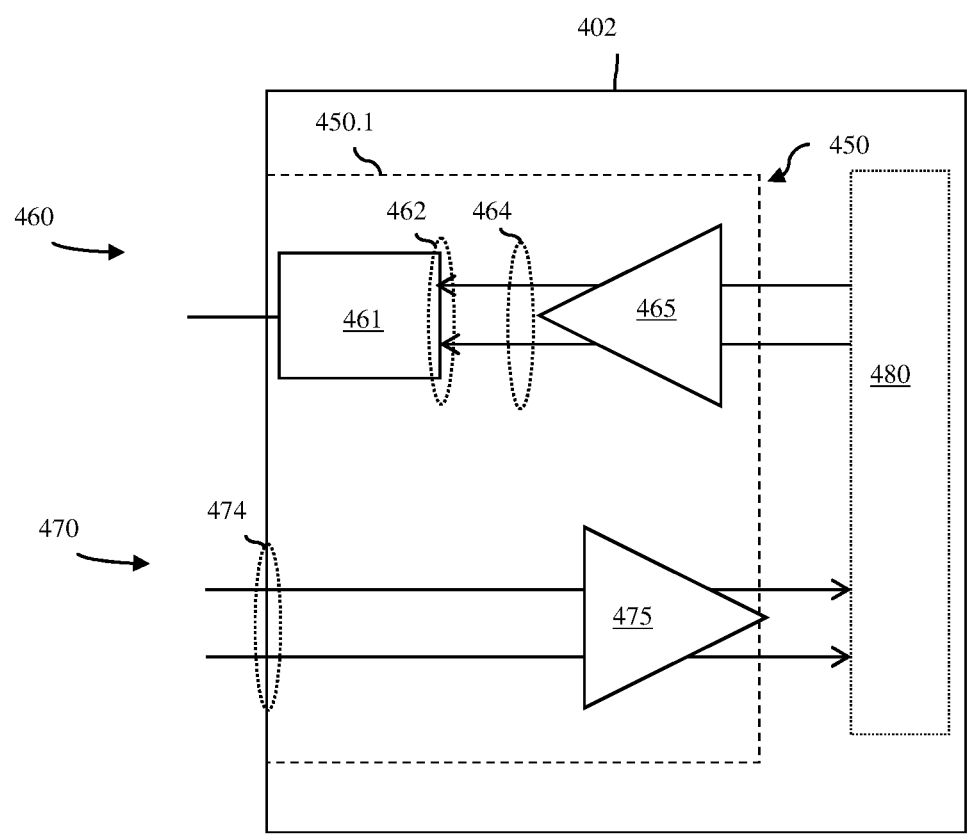

The method can include designing an RFIC chip 402 (see process step 302 and FIG. 4A, 4B or 4C). Conventionally, an RFIC chip would be designed so as to include at least one RF communication device and the radio frequency front end (RFFE) for that RF communication device. For example, the RFIC chip can include a RF communication device can be a receiver, a transmitter or transceiver. Those skilled in the art will recognize that the RFFE for a transmitter refers to all circuitry from a power amplifier to an antenna. The RFFE for a receiver refers to all circuitry from an antenna to a low noise amplifier. The RFFE for a transceiver includes all circuitry within a TX leg from a power amplifier to either a TX antenna (or, alternatively, a to a common antenna via a switch) and all circuitry within a RX leg from a low noise amplifier to an RX antenna (or, alternatively, to a common antenna via a switch). Unlike with conventional RFIC chip design, the design method disclosed herein includes splitting the RFFE 450 between the RFIC chip 402 and the package such that, in the final chip module design, the RFFE 450 will include an on-chip section 450.1 on the RFIC chip 402 and an off-chip section 450.2 in the package. Thus, at process step 302, the RFIC chip 402 is designed so as to include only an on-chip section 450.1 of the RFFE 450 for a RF communication device. This on-chip section 450.1 can be designed so as to include at least one amplifier with a first differential port and so as to be devoid of any RFFE passive devices electrically connected to that amplifier.

For purposes illustration, the method is described further below and illustrated in the drawings with respect to the RFFE 450 of a transceiver. The design of the on-chip section 450.1 of the RFFE 450 can include: for a TX leg 460, a power amplifier 465 with a differential output port 464; and, for the RX leg 470, a low noise amplifier 475 with a differential input port 474. The design of the on-chip section 450.1 of the RFFE 450 for the transceiver can further be devoid of any passive devices or matching networks, as illustrated in FIG. 4A. Alternatively, the design of the on-chip section 450.1 of the RFFE 450 could include one leg (with a passive device and matching network having a second differential port electrically connected to the first differential port of the amplifier and the other leg devoid of any passive devices and matching networks. For example, see the on-chip section 450.1 of the RFFE 450 in FIG. 4B where the RX leg 470 includes with a passive device and matching network 471 having a second differential port 472 electrically connected to the first differential port 474 of the low noise amplifier 475 and where the TX leg 460 is devoid of any passive devices and matching networks. Alternatively, see the on-chip section 450.1 of the RFFE 450 in FIG. 4C where the TX leg 460 includes with a passive device and matching network 461 having a second differential port 462 electrically connected to the first differential port 464 of the power amplifier 465 and where the RX leg 470 is devoid of any passive devices and matching networks.

In any case, typically, the amplifiers in the RFFE 450 (e.g., the power amplifier 465 and the low noise amplifier 475) would be selected (e.g., from a library) or custom-designed to meet a standard impedance (e.g., of 50 Ohms). However, because the method includes a complex power matching process that will be performed at process step 304 (described below) with respect to any port-to-port connection between an off-chip passive device and matching network and an on-chip amplifier, any on-chip amplifier that is in the RFFE 450 and electrically connected to an off-chip passive device and matching network does not need to meet a standard impedance (e.g., 50 Ohms). Instead such on-chip amplifier(s) can be selected for optimal performance, etc. with co-optimized optimum load. Additionally, since the passive device(s) of at least one leg of the RFFE 450 are moved off chip, the overall size of the RFIC chip can be scaled significantly during design at process step 302. For example, an RFIC chip, such as that RFIC chip 102 shown in FIG. 1, which includes the entire RFFE 150 could have a total area of approximately 800 microns squared ($\mu m^2$) with each balun 161, 171 having an area of approximately 90 $\mu m^2$. Thus, moving just one balun off chip would result in an area savings of over 10%.

It should be understood that design of the RFIC chip 402 at process step 302 will also include design of additional on-chip circuitry 480 (e.g., signal processor(s), etc.). Such features are well known in the art and, thus, have been omitted from this specification in order to allow the reader to focus on the salient aspects of the disclosed embodiments.

In any case, at the end of process step 302, the design for the RFIC chip 402 will indicate various chip design details including, but not limited to, descriptions of the on-chip devices (e.g., including transistor types, sizes, etc.), the overall size of the chip, the power requirement for the chip, and S-parameters associated with the ports of the amplifiers in the on-chip section 450.1 of the RFFE 450. For the power amplifier 465, the S-parameters can include output port voltage reflection coefficients (S22s) for different frequencies with a given bandwidth. For the low noise amplifier 475, the S-parameters can include input port voltage reflection coefficients (S11s) for the different frequencies with the same given bandwidth. Those skilled in the art will recognize that S-parameters, including S22 and S11 as well as other S-parameters (e.g., forward voltage gain (S21), reverse voltage gain (S12), etc.) are complex numbers. Each S-parameter includes both a real part (a) and an imaginary part (jX) (e.g., a+jX) and varies with variations in frequency of the signal input to or output from the respective port. Thus, for example, S22s associated with the differential output port 464 of the power amplifier 465 will vary as a function of the frequency of the output differential signal (i.e., the transmitted differential signal), whereas S11s associated with the differential input port 474 of the low noise amplifier 475 will vary as a function of the frequency of the input differential signal (i.e., the received differential signal). Those skilled in the art will recognize that such S-parameters are typically determined through simulation.

Referring again to FIG. 3, the method can further include accessing the RFIC chip design from process step 302 (including the various chip design details mentioned above) and, based on the RFIC design and those chip design details, designing a package 401 for the RFIC chip 402 including the off-chip section 450.2 of the RFFE 450 (see process step 304).

Specifically, the package 401 can be designed at process step 304 so as to include a package substrate (e.g., a laminate substrate). The package substrate can have, for example, ball grid arrays (BGAs) on a back surface to facilitate mounting of the package substrate onto a printed circuit board (PCB) and to further provide the electrical connections between the package substrate and the PCB (e.g., for power supply, signal transmission, etc.) as well as isolation around those electrical connections. The package substrate can include vias and wires (e.g., power traces, signal traces, etc.) to provide in-package and package-to-PCB electrical connections. The package 401 can further be designed to include a chip mounting layer. The chip mounting layer refers to a layer upon which the RFIC chip 402 or, if applicable, multiple chips including the RFIC chip 402 is/are to be mounted. This chip mounting layer can be the package substrate itself. That is, chip(s) can be mounted directly on the front side of the package substrate opposite the back side (e.g., by controlled collapse chip connections (C4 connections)). Alternatively, the chip mounting layer can be an interposer mounted on the front side of the package substrate opposite the back side (e.g., by C4 connections) and the chip(s) can be mounted on the interposer (e.g., also by C4 connections) such that the interposer is stacked between the package substrate and the chip(s). The interposer is ideally employed for multi-chip modules and includes vias and wiring (e.g., power traces, signal traces, etc.) to provide chip-to-chip electrical connections and chip-to-substrate electrical connections.

In any case, the package 401 can be designed such that it includes an off-chip section 450.2 of the RFFE 450 either on the package substrate or, if applicable, on the interposer. The off-chip section 450.2 can include at least one passive device and matching network with a second differential port, which is electrically connected to a first differential port of an on-chip amplifier.

Figure 5A:
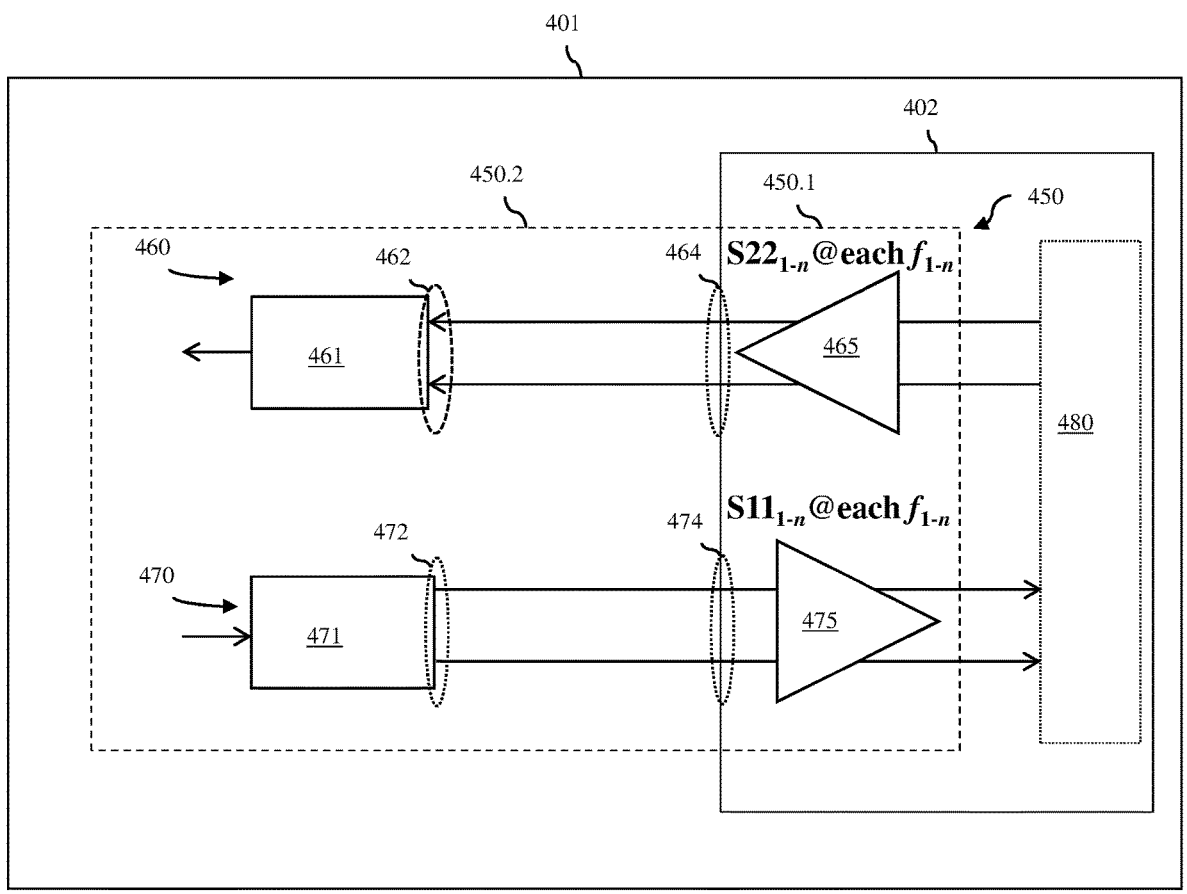
FIGS. 5A-5C are schematic diagrams illustrating alternative package designs for the RFIC chip designs of FIGS. 4A-4C, respectively, generated according to the method.

For example, consider the off-chip section 450.2 in FIG. 5A, which is designed given the on-chip section 450.1 of FIG. 4A. For the TX leg 460 of the RFFE 450 of a transceiver, the off-chip section 450.2 can be design at process step 304 so as to include at least one off-chip passive device and matching network 461 with a differential input port 462 that is electrically connected to the differential output port 464 of the power amplifier 465. In some embodiments, the off-chip passive device and matching network 461 can be combined in a single device such as a balun with a differential input port 462. The balun can receive the differential signal from the differential output port 464 of the power amplifier 465, can convert the received differential signal into an impedance matched single-ended signal (i.e., an impedance matched and unbalanced signal), and can output the impedance matched single-ended signal via a switch to an antenna for transmission. In other embodiments, the off-chip passive device and matching network 461 could be a circuit, which includes a differential input port 462 for receiving the differential signal from the power amplifier 465, a matching network for performing impedance matching, and a passive device (e.g., a transformer, phase shifter, etc.) connected to the matching network for performing other signal processing (e.g., transforming, phase-shifting, etc.) prior to passing via an optional balun and switch to an antenna for transmission. Similarly, for the RX leg 470 of the RFFE 450 of a transceiver, the off-chip section 450.2 can include at least one off-chip passive device and matching network 471 with a differential output port 472 that is electrically connected to the differential input port 474 of the low noise amplifier 475. In some embodiments, the off-chip passive device and matching network 471 can be combined in a single device such as a balun with a differential output port 472. The balun can receive a single-ended signal (i.e., an unbalanced signal) from the antenna via the switch, can convert the single-ended signal into an impedance matched differential signal, and can apply the impedance matched differential signal to the differential input port 474 of the low noise amplifier 475 for subsequent on-chip processing.

As mentioned above, ideally, the design for the on-chip section 450.1 of the RFFE 450 would be devoid of any passive devices and match networks and, thus, the design for the off-chip section 450.2 of the RFFE 450 would include a passive device and matching network for both the TX leg 460 and the RX leg 470, as illustrated. However, alternatively, the design for the on-chip section 450.1 could include a passive device and matching network in one of leg (e.g., the TX leg or the RX leg) and, thus, only the other leg would include the passive device and matching network in the design of the off-chip section 450.2 of the RFFE 450 (e.g., see the off-chip section 450.2 in FIG. 5B, which is designed given the on-chip section 450.1 shown in FIG. 4B; see also the off-chip section 450.2 in FIG. 5C, which is designed given the on-chip section 450.1 shown in FIG. 4C).

In any case at process step 304, each off-chip passive device and matching network (e.g., 461 in the TX leg 460 and/or 471 in the RX leg 470) in the off-chip section 450.2 can be configured based on the results of complex power matching process that employs S-parameters from the RFIC chip design (as opposed to a standard impedance target) to power match the differential port of the off-chip passive device and matching network to the differential port of the on-chip amplifier at not one, but multiple different frequencies, within a given bandwidth.

Figure 5B:
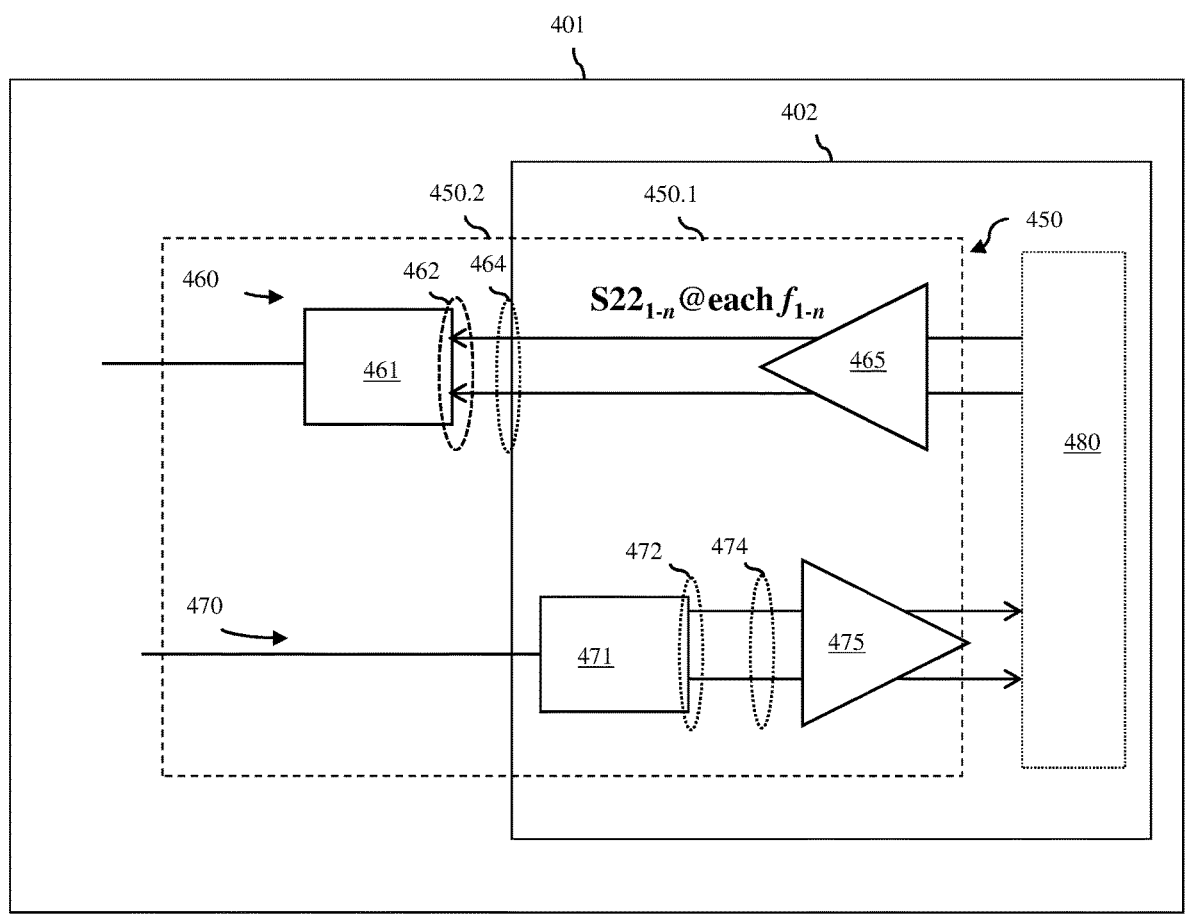
Figure 5C:
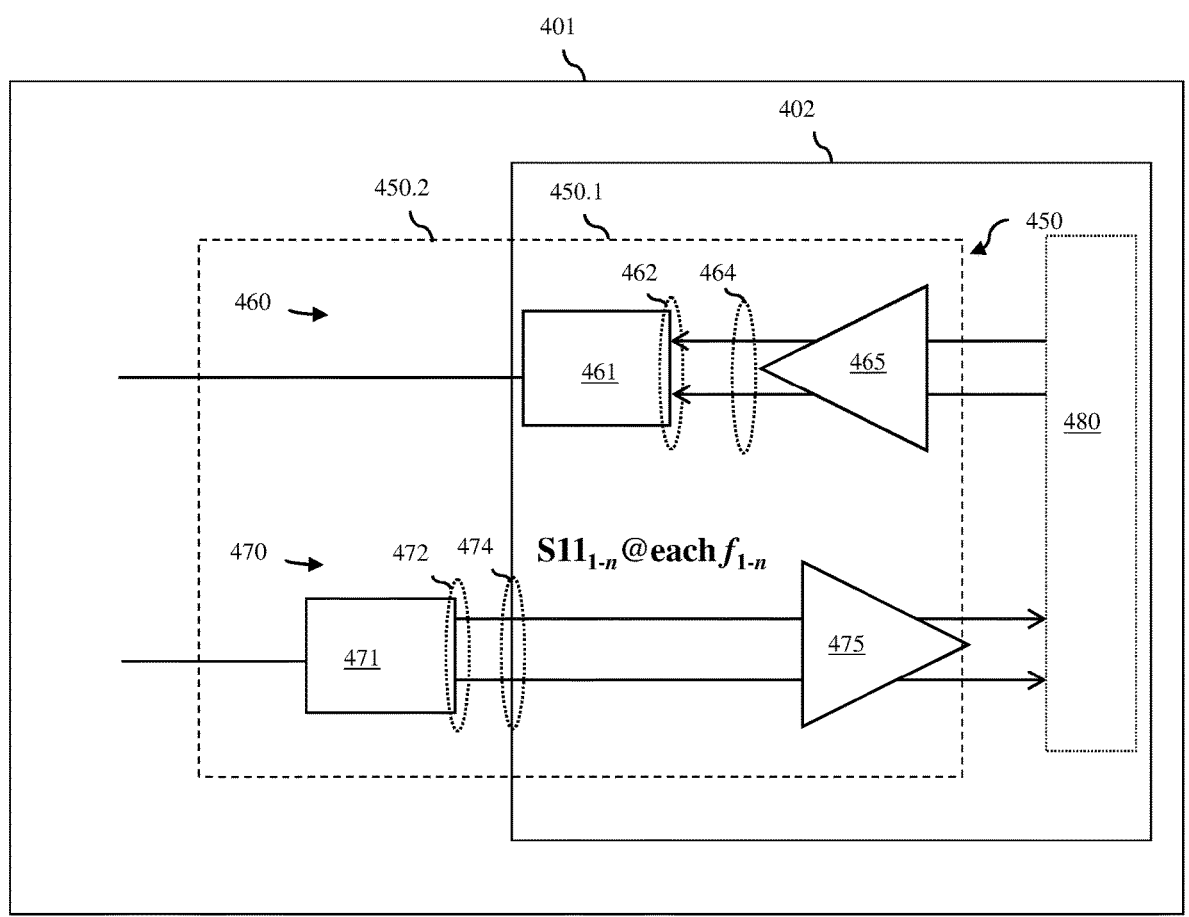

For example, in a TX leg 460 where the off-chip passive device and matching network 461 of an off-chip section 450.2 (e.g., as shown in FIG. 5A or 5B) is a balun, the balun can be configured so that the differential input port 462 is power matched to the differential output port 464 of the power amplifier 465 based on the previously determined S22 values (i.e., the different output port voltage reflection coefficients) for differential signals of different frequencies within a given bandwidth. In an RX leg 470 where the off-chip passive device and matching network 471 of the off-chip section 450.2 (e.g., as shown in FIG. 5A or 5C) similarly comprises a balun, the balun can be configured so that the differential output port 472 is power matched to the differential input port 474 of the low noise amplifier 475 based on the previously determined S11 values (i.e., the different input port voltage reflection coefficients) for differential signals of different frequencies within the given bandwidth.

To accomplish this complex power matching process, typically, one component designer usually defines the input impedance for the following component and it is usually a discrete impedance and more traditionally 50 Ohm. In case of power matching instead of matching one input impedance value of one component to the output impedance of the adjacent component complex conjugate matching is performed. More specifically, if the output impedance of one component (e.g. a differential PA) is (a+jb) Ohm and if the following component is a balun, then its differential input impedance needs to be (a−jb) Ohm, thereby the complex part cancels each other. One aspect of this complex impedance is its frequency dependency, where (a±jb) Ohm is fixed for a given frequency and not valid for the entire frequency bandwidth of interest. The terminology broadband complex power matching is used to refer to the power matching approach for the entire frequency bandwidth using the co-optimization approach of IC and package together.

Figure 6:
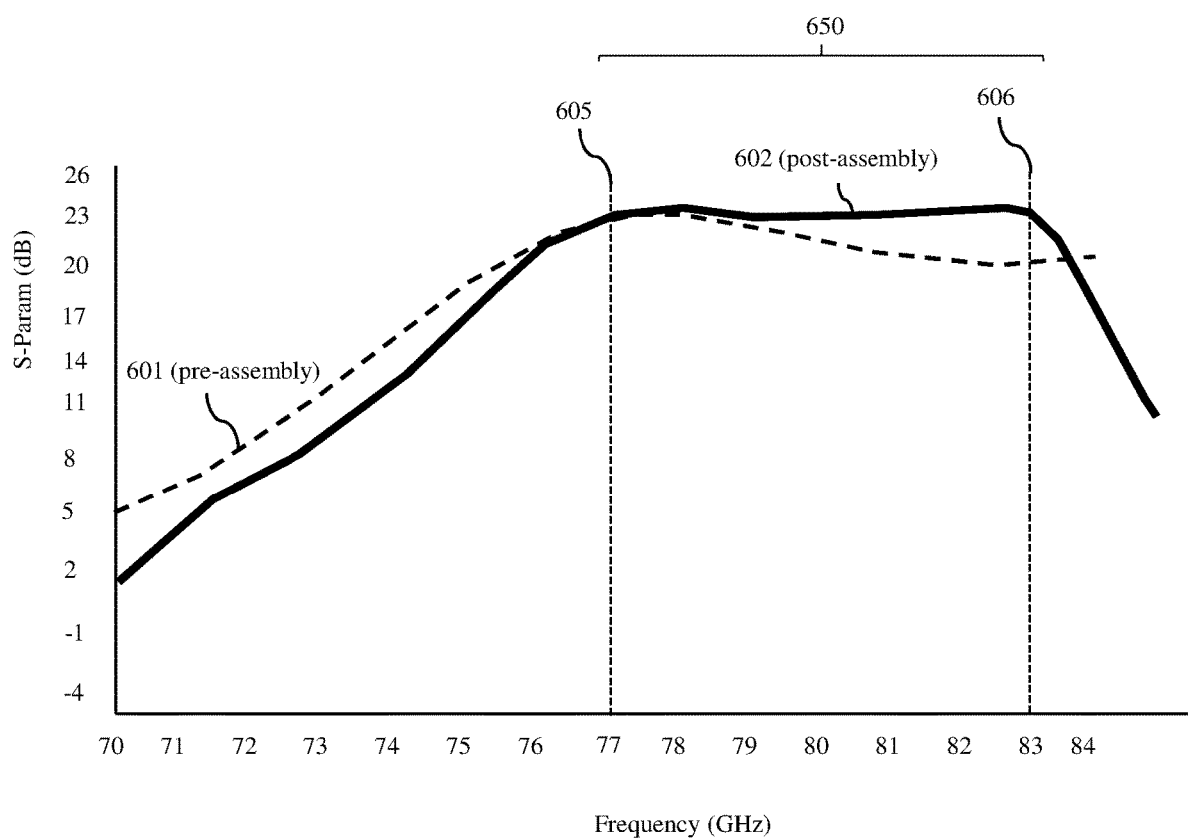
FIG. 6 is a graph illustrating exemplary forward voltage gain (S21) of a differential signal passing from an on-chip power amplifier to an off-chip passive device and matching network pre-assembly and post-assembly, given chip module design according to the method.

Due to this complex power matching process, the voltage gain (e.g., S21 or S12) can remain at its peak across a relatively wide bandwidth. For example, the difference between the high cut-off frequency and the low cut-off frequency of the given bandwidth could be up to 5 GHz or more and can be customized for a particular application. For example, in some embodiments, the frequency range of the given bandwidth can extend from approximately 77 GHz to approximately 83 GHz—an optimal range for automotive radars. Specifically, FIG. 6 is a graph illustrating the results of this complex power matching process specifically for off-chip section 450.2 of the TX leg 460. This graph shows exemplary forward voltage gain (S21) of differential signals at different frequencies passing from the power amplifier 465 to the balun 461 in the off-chip section 450.2 of the RFFE 450 both before package assembly (see curve 601 (pre-assembly)) and after package assembly (see curve 602 (post-assembly)). Prior to package assembly, peak power transfer (e.g., of 23 dB forward voltage gain (S21)) is achieved at a specific frequency (e.g., at 77 GHz), but drops at all other frequencies (see curve 601). However, because of the complex power matching process employed in the method, frequency performance actually improves following package assembly. That is, after package assembly, the forward voltage gain (S21) does not drop below 23 dB at frequencies just above 77 GHz, but instead remains essentially constant at 23 dB across the given bandwidth 650 (e.g., from a low cut-off frequency 605 at approximately 77 GHz to a high cut-off frequency 606 at approximately 83 GHz) (see curve 602). The same will essentially be true for the RX leg 460.

It should be noted that, due to the improved performance that results from the above-described complex power matching processes (e.g., to the power amplifier 465 and/or the low noise amplifier 475 of the on-chip section 450.1), the power requirement for the chip (which was previously determined as a part of the RFIC chip design at process step 302) can be reduced. Thus, the method can include comparing a new chip power requirement to a previous chip power requirement to determine if the complex power matching processes performed at process step 304 have resulted in a reduction in the chip power requirement (see process step 306). If not, the method can end. If so, however, the method can include repeating the designing the chip and designing the package iteratively in a chip-package co-optimization process. That is, the method can include, given the reduction in the chip power requirement, determining whether or not device size scaling (e.g., transistor size scaling) and, thus, overall chip size scaling is possible (see process step 308). If not, the method can end. If so, the processes of designing the chip (see process step 302) and designing the package (see process step 304) can be iteratively repeated. That is, process step 302 can be repeated in order to reduce the size of at least some on chip-devices (e.g., at least some transistors) and, thereby to reduce overall chip size. The new chip design will indicate various design details, including but not limited to, updated descriptions of the on-chip devices (e.g., including transistor types, sizes, etc.), the overall size of the chip, the power requirement for the chip, and S-parameters associated with the ports of the amplifiers in the on-chip section 450.1 of the RFFE 450.

Process step 304 can then be repeated including redesign of the off-chip section 450.2 of the RFFE 450 including the complex power matching processes based on the new chip design and, particularly, the new S-parameters and, particularly, the new port voltage reflection coefficients. That is, each off-chip passive device and matching network of the off-chip section 450.2 can be reconfigured so that its differential port is power matched to the differential port of an on-chip amplifier based on new port voltage reflection coefficients. For example, in the TX leg 460, the off-chip passive device and matching network 461 can be reconfigured so that its differential input port 462 is power matched to the differential output port 464 of the power amplifier 465 based on new output voltage reflection coefficients (S22$s$); whereas, in the RX leg 470, the off-chip passive device and matching network 471 can be reconfigured so that its differential output port 472 is power matched to the differential input port 474 of the low noise amplifier 475 based on the new input port voltage reflection coefficients (S11$s$).

Such iterative processing can be completed when the chip power requirement can no longer be reduced, when device size scaling is no longer feasible, or when iterative processing has been performed for some given period of time during which no significant change in power reduction, performance, and/or size scaling is observed.

It should be noted that chip module design method described above can be implemented in whole or in part using a computer-aided design (CAD) system and/or as a computer program product.

Figure 7:
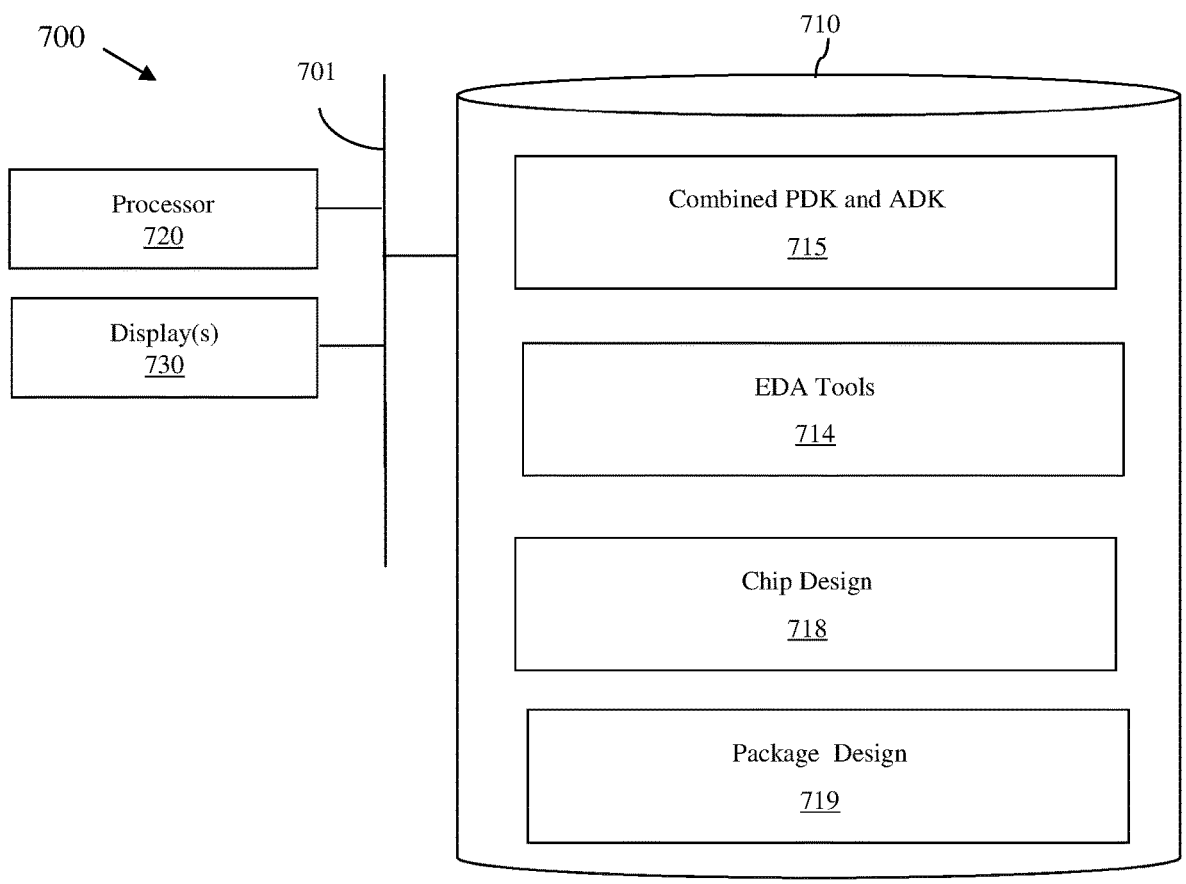
FIGS. 7 and 8 are schematic diagrams illustrating a computer-aided design (CAD) system and a representative hardware environment, respectively, for implementing the method.

Specifically, referring to FIG. 7, also disclosed herein are embodiments of a computer-aided design (CAD) system 700 for designing a chip module according to the method described above. The CAD system can include one or more processors 720, one or more displays 730, and one or more storage mediums 710 (e.g., storage devices), which is/are readable by the processor(s) 720. The various components of the CAD system 700 including, but not limited to, the processor(s) 720, display(s) 730, and storage mediums(s) 710 can be interconnected over a system bus 701, as illustrated, and/or over a wired or wireless network (not shown). Furthermore, the various components of the CAD system can be co-located. Alternatively, the CAD system can be a client-server system with a central server and multiple networked workstations. Alternatively, the CAD system can be a distributed system whose components are distributed across different networked computers. In any case, for purposes of illustration, the CAD system is illustrated in FIG. 7 as if it incorporates only a single processor 720, a single display 730, and a single storage medium 710. However, it should be understood that, alternatively, the CAD system can incorporate multiple processors 720 for performing one or more of the different steps in the design flow, as discussed above, multiple displays 730, and any number of one or more storage mediums, which store the data and tools that are employed during the different steps in the design flow. The storage medium 710 can store a process and assembly design kit (PADK) 715 (see the detailed discussion above) and can further store various programs of instructions (e.g., electronic design automation (EDA) tools 714). The processor(s) 720 can execute the programs of instruction and, using the data and other information from the PADK 715, can perform the above-described chip module design method that includes iteratively repeating chip design and package design in a chip-package co-optimization process. The storage medium 710 can further store chip and package designs 718-719, which are generated by the processor(s) 720 during the chip module design method and which are further accessible by the processor(s) 720 when iteratively repeating chip design and package design in the chip-package co-optimization process.

A computer program product may include a computer readable storage medium (or media) having computer readable program instructions thereon for causing a processor to carry out aspects of the present invention.

The computer readable storage medium can be a tangible device (i.e., a non-transitory storage medium) that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
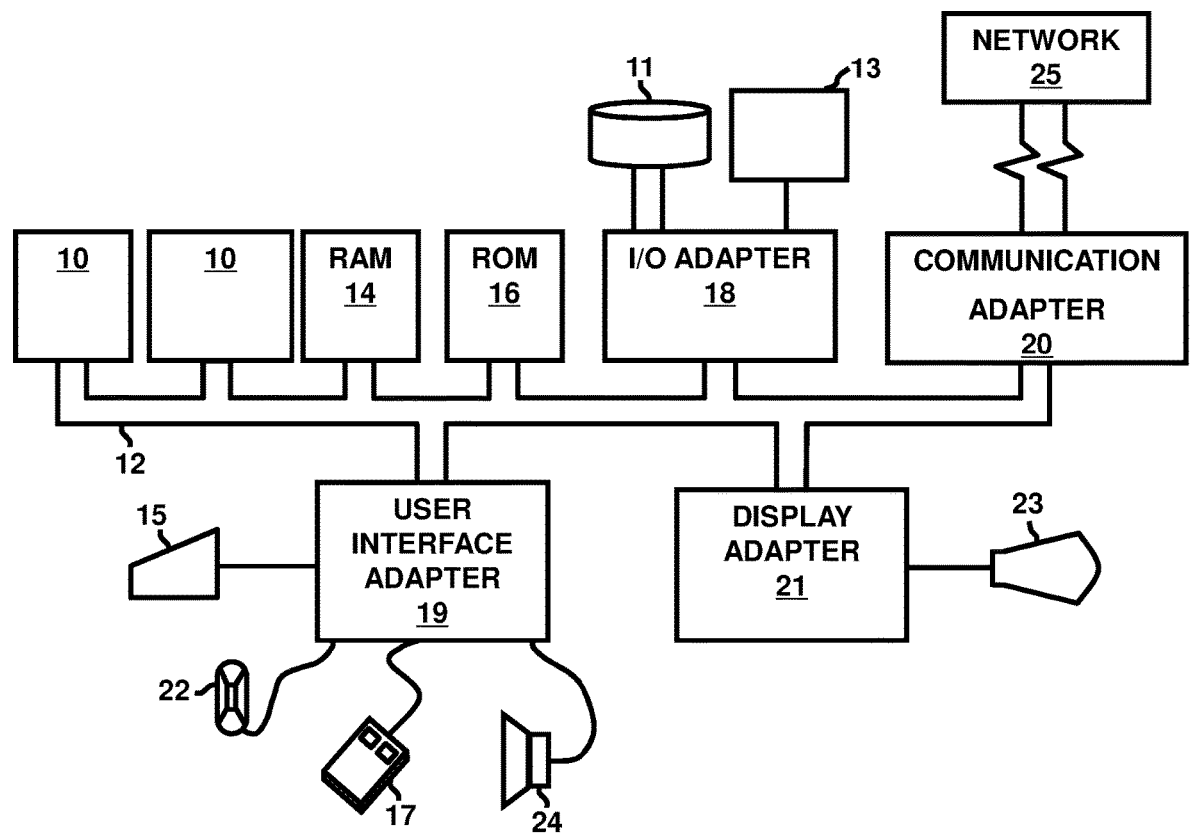

A representative hardware environment (i.e., a computer system) for implementing the design method, system and computer program product, described above, is illustrated in FIG. 8. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 9A:
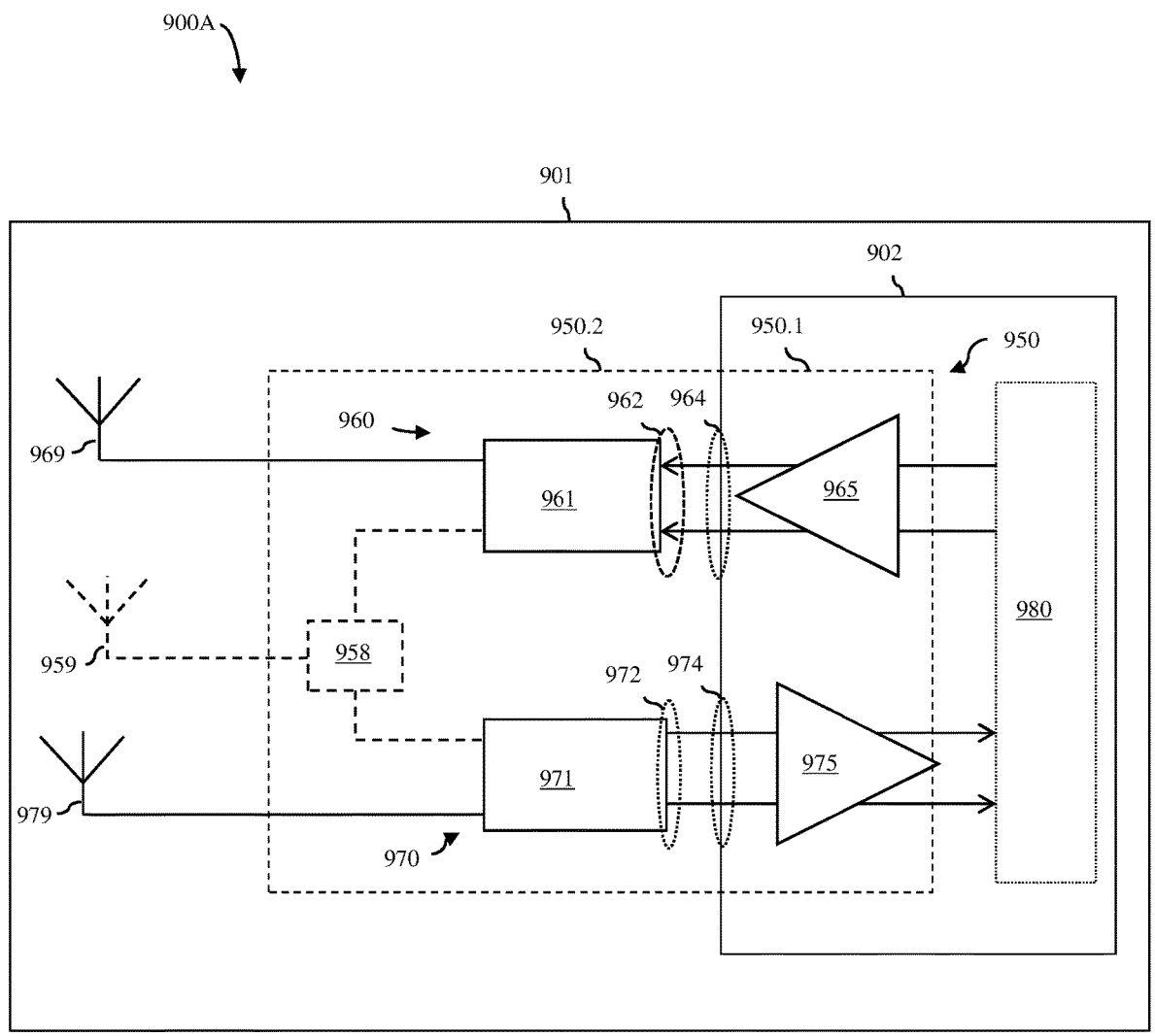
FIGS. 9A-9C are layout diagrams illustrating alternative chip module designs generated according to the method.
Figure 9B:
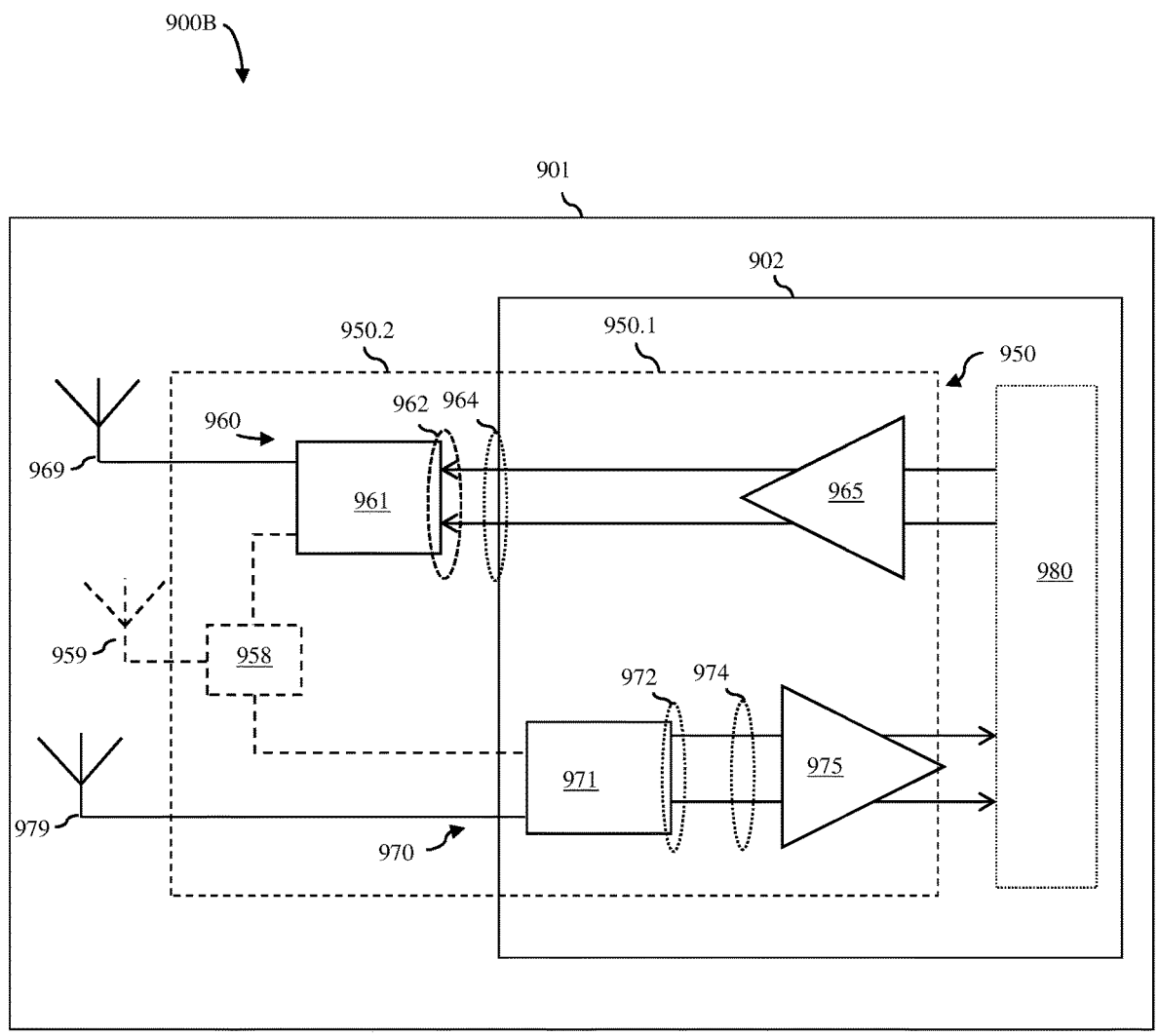
Figure 9C:
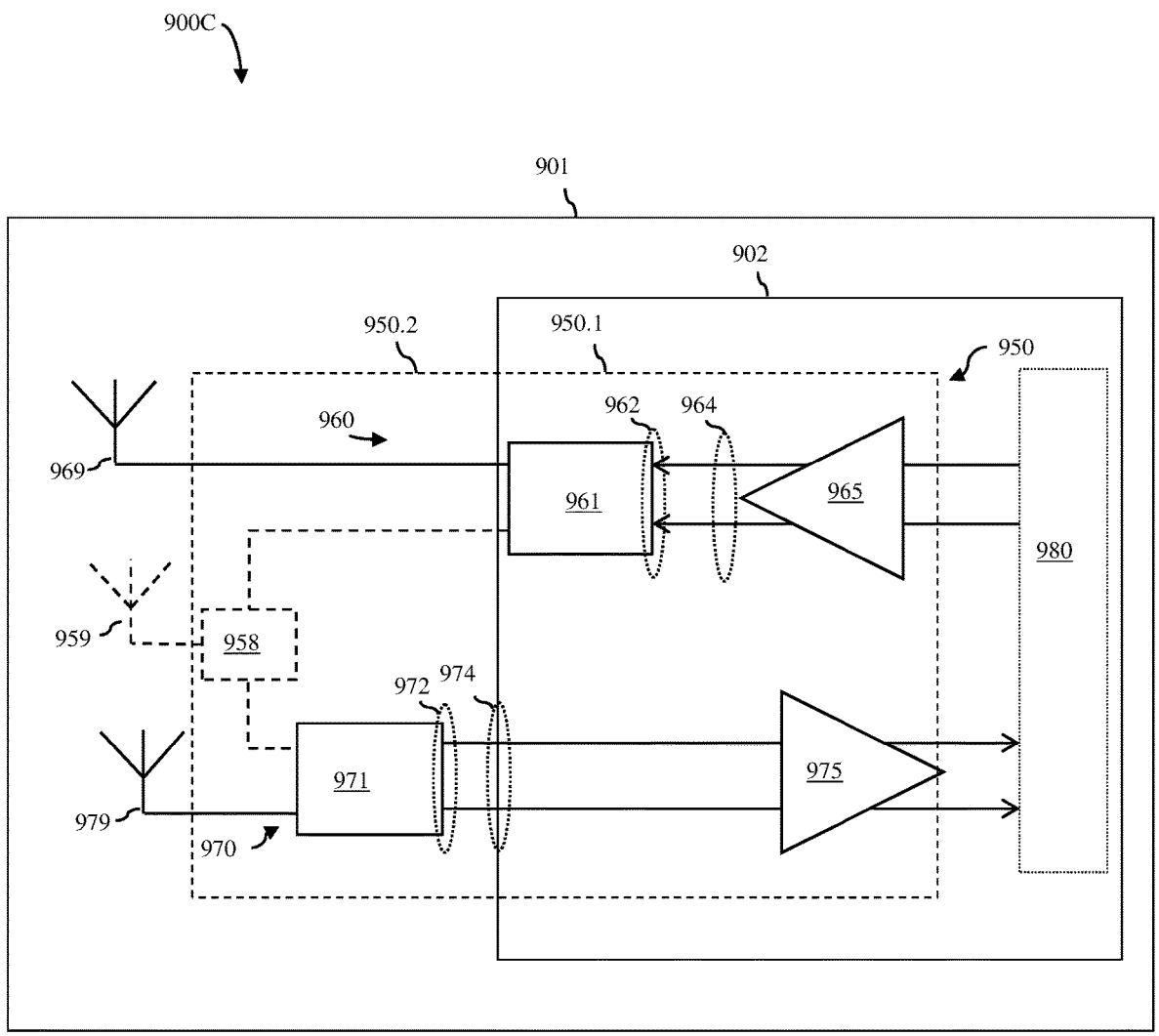
Figure 10:
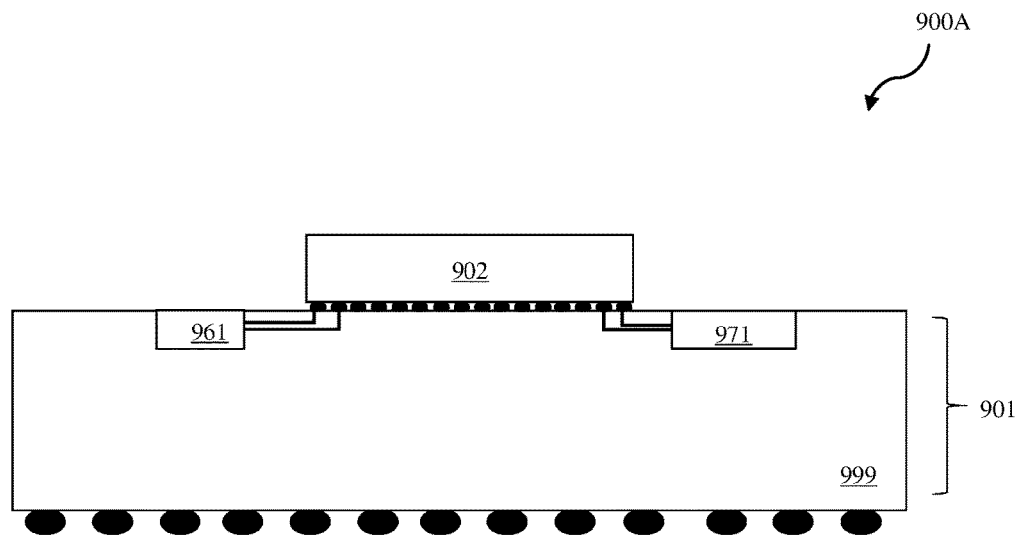
FIG. 10 is a cross-section diagram illustrating exemplary embodiments where off-chip passive device and matching network(s) are on the package substrate.
Figure 11:
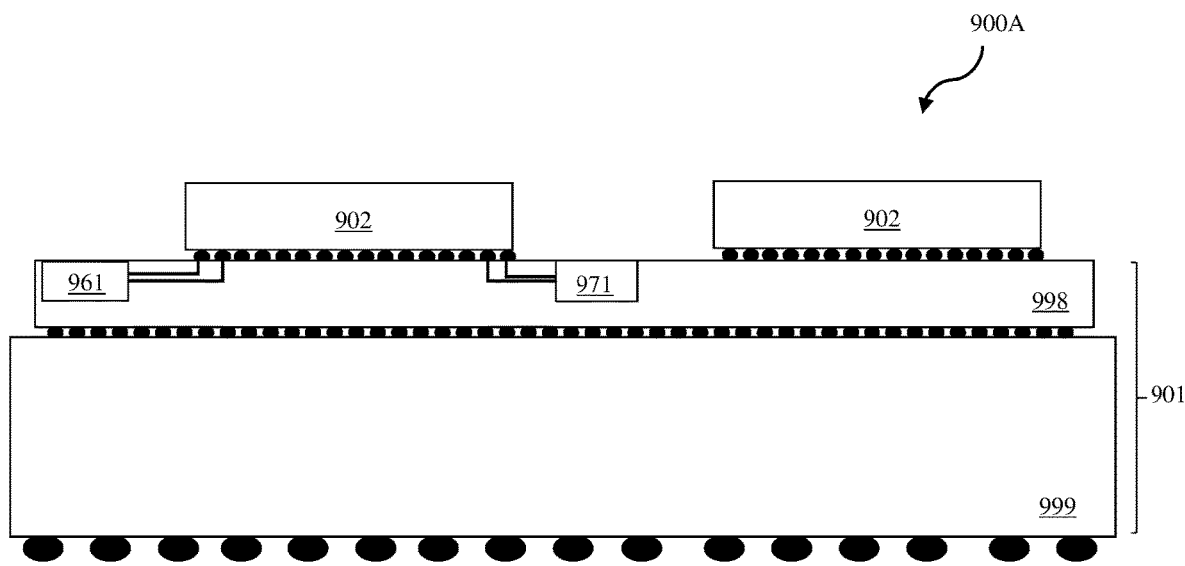
FIG. 11 is a cross-section diagram illustrating exemplary embodiments where off-chip passive device and matching network(s) are on an interposer, which is mounted on the package substrate.

Also disclosed herein are embodiments of a chip module structure 900A-900C (see FIGS. 9A-9C, respectively, see also FIGS. 10 and 11). The chip module structure 900A-900C can be designed according to the above-described method and subsequently manufactured.

This chip module structure 900A-900C can include: a radio frequency integrated circuit (RFIC) chip 902; optionally, one or more additional chips; and a package 901 for the RFIC chip 902 and any other chips.

The RFIC chip 902 can include on-chip circuitry 980 (e.g., signal processor(s), etc.). Such features are well known in the art and, thus, have been omitted from this specification in order to allow the reader to focus on the salient aspects of the disclosed embodiments.

Referring to FIGS. 10 and 11, the package 901 can include a package substrate 999 (e.g., a laminate substrate). The package substrate 999 can have, for example, ball grid arrays (BGAs) on a back surface to facilitate mounting of the package substrate onto a printed circuit board (PCB) and to further provide the electrical connections between the module substrate and the PCB (e.g., for power supply, signal transmission, etc.) as well as isolation around those electrical connections. The package substrate 999 can includes vias and wires (e.g., power traces, signal traces, etc.) to provide in-package and package-to-PCB electrical connections. The package 901 can include a chip mounting layer. The chip mounting layer refers to a layer upon which the RFIC chip 902 or, if applicable, multiple chips including the RFIC chip 402 is/are to be mounted. This chip mounting layer can be the package substrate itself (as shown in FIG. 10). That is, chip(s) including the RFIC chip 902 can be mounted directly on the front side of the module substrate opposite the back side (e.g., by controlled collapse chip connections (C4 connections)) Alternatively, the package 901 can further include an interposer 998 and this interposer 998 can be the chip mounting layer (see FIG. 11). That is, the interposer 998 can be mounted on the front side of the package substrate 999 opposite the back side (e.g., by C4 connections) and chip(s) including the RFIC chip 902 can be mounted on the interposer 998 (e.g., also by C4 connections) such that the interposer 998 is stacked between the package substrate 999 and the chip(s). The interposer is ideally employed for multi-chip modules and includes vias and wiring (e.g., power traces, signal traces, etc.) to provide chip-to-chip electrical connections and chip-to-substrate electrical connections.

The chip module 900A-900C can include a radio frequency front end (RFFE) 950 for a RF communication device. The RF communication device can be a receiver, a transmitter or transceiver. Those skilled in the art will recognize that the RFFE for a transmitter refers to all circuitry from a power amplifier to an antenna. The RFFE for a receiver refers to all circuitry from an antenna to a low noise amplifier. For purposes of illustration, the RF communication device is described below and illustrated in the drawings as being a transceiver. The RFFE 950 for a transceiver can include, for example, a transmitter (TX) leg 960 and a receiver (RX) leg 970. The TX leg 960 can include, for example, a power amplifier 965 and a passive device and matching network 961, which is connected in series between the power amplifier 965 and a TX antenna 969. RX leg 970 can include a low noise amplifier 975 and a passive device and matching network 971, which is connected in series between an RX antenna 979 and the low noise amplifier 975. As indicated, the TX leg 960 and the RX leg 970 can each have discrete antennas 969 and 979, respectively. Alternatively, the TX leg 960 and the RX leg 970 could be connected to a shared antenna 959 via a switch 958, which is configured to selectively connect either the passive device and matching network 961 of the TX leg 960 to the shared antenna 959 for transmitting signals or the passive device and matching network 971 of the RX leg 970 to the shared antenna 959 for receiving signals.

In any case, the RFFE 950 can include an on-chip section 950.1 (i.e., a section on the RFIC chip 902 itself) and an off-chip section 950.2 (i.e., a section in the package 901).

The on-chip section 950.1 can include at least one amplifier with a first differential port and the off-chip section 950.2 can include a passive device and matching network with a second differential port electrically connected to that amplifier.

For example, as illustrated in the chip module structure 900A of FIG. 9A, for the TX leg 960 of the RFFE 950 of a transceiver, the on-chip section 950.1 can include a power amplifier 965 with a differential output port 964. For the RX leg 970 of the RFFE 950 of a transceiver, the on-chip section 950.1 can include a low noise amplifier 975 with a differential input port 974. For the TX leg 960 of the RFFE 950 of a transceiver, the off-chip section 950.2 can include at least one off-chip passive device and matching network 961 with a differential input port 962 that is electrically connected to the differential output port 964 of the power amplifier 965. In some embodiments, the off-chip passive device and matching network 961 can be combined in a single device such as a balun with a differential input port 962. The balun can receive the differential signal from the differential output port 964 of the power amplifier 965, can convert the received differential signal into an impedance matched single-ended signal (i.e., an impedance matched and unbalanced signal), and can output the impedance matched single-ended signal to an antenna (optionally via a switch) for transmission. In other embodiments, the off-chip passive device and matching network 961 could be a circuit, which includes a differential input port 962 for receiving the differential signal from the power amplifier 965, a matching network for performing impedance matching, and a passive device (e.g., a transformer, phase shifter, etc.) connected to the matching network for performing other signal processing (e.g., transforming, phase-shifting, etc.) prior to passing to an antenna (e.g., via an optional balun and/or switch) for transmission. Similarly, for the RX leg 970 of the RFFE 950 of a transceiver, the off-chip section 950.2 can include at least one off-chip passive device and matching network 971 with a differential output port 972 that is electrically connected to the differential input port 974 of the low noise amplifier 975. In some embodiments, the off-chip passive device and matching network 971 can be combined in a single device such as a balun with a differential output port 972. The balun can receive a single-ended signal (i.e., an unbalanced signal) from an antenna (optionally via a switch), can convert the single-ended signal into an impedance matched differential signal, and can apply the impedance matched differential signal to the differential input port 974 of the low noise amplifier 975 for subsequent on-chip processing.

Alternatively, as illustrated in the chip module structures 900B of FIG. 9B or 900C of FIG. 9C, one leg of the RFFE 950 could include a passive device and matching network in the on-chip section 950.1 and the other leg of the RFFE 950 could include a passive device and matching network in the off-chip section. It should be noted that the features of the off-chip section 950.2 of the RFFE 950, as described above (e.g., the passive device and matching network 961 of the TX leg 960 and/or the passive device and the matching network 971 of the RX leg 970) can be located either on the package substrate 999 (as illustrated in FIG. 10) or, if applicable, on the interposer 998 (as illustrated in FIG. 11).

Because the chip module method, described above, includes a complex power matching process performed with respect to any port-to-port connection between an off-chip passive device and network and an on-chip amplifiers, any on-chip amplifier that is in the on-chip section 950.1 of the RFFE 950 and electrically connected to an off-chip passive device and matching network in the off-chip section 950.2 will not necessarily meet a standard impedance (e.g., 50 Ohms). Instead such on-chip amplifier(s) can be selected for optimal performance, etc. Because passive device(s) of at least one leg of the RFFE 950 are included in the off-chip section 950.2, the overall size of the RFIC chip can be scaled significantly during design as compared to an RFIC chip were the RFFE is entirely on-chip. Additionally, because each off-chip passive device and matching network (e.g., 961 in the TX leg 960 and/or 971 in the RX leg 970) in the off-chip section 950.2 is configured based on the results of a complex power matching process that employs S-parameters from the RFIC chip design (as opposed to a standard impedance target), the differential port of the off-chip passive device and matching network is power matched to the differential port of the on-chip amplifier at not one, but multiple different frequencies, within a given bandwidth. That is, in a TX leg 960 of the RFFE 950 where the off-chip passive device and matching network 961 is a balun, the differential input port 962 of the balun can be power matched to the differential output port 964 of the power amplifier 965 for differential signals of different frequencies within a given bandwidth. Similarly, in the RX leg 970 of the RFFE 950 where the off-chip passive device and matching network 971 is a balun, the differential output port 972 of the balun can be power matched to the differential input port 974 of the low noise amplifier 975 for differential signals of different frequencies within the same given bandwidth. This given bandwidth where the voltage gain (e.g., S21 or S12) remains steady at its peak can be relatively wide. For example, the difference between the high cut-off frequency and the low cut-off frequency of the given bandwidth could be up to 5 GHz or more and can be customized for a particular application. In some embodiments, the frequency range of the given bandwidth can extend from approximately 77 GHz to approximately 83 GHz—an optimal range for automotive radars (e.g., see the detailed discussion of FIG. 6 above).

The RFIC chip 902 can include, for the radio frequency front end (RFFE), an on-chip amplifier having a first differential port. The chip module structure can further include a package for the RFIC chip. This package can include, for the RFFE, an off-chip passive device and matching network with a second differential port that is electrically connected to the first differential port of the on-chip amplifier. The off-chip passive device and matching network can be combined in a single device such as a balun. Alternatively, the off-chip passive device and matching network can be discrete electrically connected components (e.g., a transformer and matching network; a phase shifter and matching network; etc.). In any case, the off-chip passive device and matching network can specifically be configured based on a complex power matching process such that the second differential port is power matched to the first differential port at different frequencies within a given bandwidth.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A chip module comprising:
    a chip comprising an on-chip amplifier having a first differential port associated with different voltage reflection coefficients for differential signals at different frequencies within a given bandwidth; and
    a package for the chip, wherein the package comprises an off-chip passive device and matching network having a second differential port electrically connected to the first differential port of the on-chip amplifier, wherein the second differential port is power matched to the first differential port at the different frequencies within the given bandwidth.

2. The chip module of claim 1,
    wherein the on-chip amplifier comprises a power amplifier for any of transmitter and a transmitter leg of a transceiver,
    wherein the first differential port is associated with different output port voltage reflection coefficients for output differential signals at the different frequencies within the given bandwidth, and
    wherein the second differential port is power matched to the first differential port based on the different output port voltage reflection coefficients to ensure a same maximum forward voltage gain when an output differential signal has any of the different frequencies within the given bandwidth.

3. The chip module of claim 1,
    wherein the on-chip amplifier comprises a low noise amplifier for any of a receiver and a receiver leg of a transceiver,
    wherein the first differential port is associated with different input port voltage reflection coefficients for input differential signals at the different frequencies within the given bandwidth, and
    wherein the second differential port is power matched to the first differential port based on the different input port voltage reflection coefficients to ensure a same maximum reverse voltage gain when an input differential signal has any of the different frequencies within the given bandwidth.

4. The chip module of claim 1, wherein a difference between a high cut-off frequency and a low cut-off frequency of the given bandwidth is at least 5 GHz.

5. The chip module of claim 1, wherein the given bandwidth extends from approximately 77 GHz to approximately 83 GHz.

6. The chip module of claim 1, wherein the off-chip passive device and matching network comprise a balun.

7. The chip module of claim 1, wherein the off-chip passive device and matching network comprise any of a transformer and matching network and a phase shifter and matching network.

8. The chip module of claim 1, wherein the package comprises: a substrate, wherein the chip is mounted on the substrate and wherein the off-chip passive device and matching network are on the substrate positioned laterally adjacent to the chip.

9. The chip module of claim 1, wherein the package comprises: a substrate; and an interposer mounted on the substrate, wherein the chip is mounted on the interposer, and wherein the off-chip passive device and matching network are on any one of the substrate and the interposer.

10. A method comprising:
    accessing details of on-chip amplifier of a chip, wherein the on-chip amplifier has a first differential port associated with different voltage reflection coefficients for differential signals at different frequencies within a given bandwidth; and
    based on the details, configuring an off-chip passive device and matching network for a package for the chip, wherein the off-chip passive device and matching network has a second differential port electrically connected and power matched to the first differential port at the different frequencies within the given bandwidth.

11. The method of claim 10, further comprising designing a chip module,
    wherein the designing of the chip module comprises:
        designing a chip comprising the on-chip amplifier; and
        designing a package for the chip such that the package comprises the off-chip passive device and matching network,
    wherein the configuring the off-chip passive device and matching network is performed so that the second differential port is power matched to the first differential port based on the different port voltage reflection coefficients at the first differential port and associated with differential signals at the different frequencies within the given bandwidth,
    wherein the configuring of the off-chip passive device and matching network results in a reduction in a power requirement for the chip, wherein the method further comprises iteratively repeating the designing of the chip and the designing of the package, and wherein the iteratively repeating comprises:

given the reduction in the power requirement for the chip, redesigning the chip by scaling device sizes, wherein the scaling of the device sizes results in new port voltage reflection coefficients at the first differential port; and redesigning the package by reconfiguring the off-chip passive device and matching network so that the second differential port is power matched to the first differential port based on the new port voltage reflection coefficients.

12. The method of claim 10, further comprising designing a chip module, wherein the designing of the chip module comprises:
designing a chip comprising the on-chip amplifier; and
designing a package for the chip such that the package comprises the off-chip passive device and matching network, wherein the on-chip amplifier comprises a power amplifier for any of a transmitter and a transmitter leg of a transceiver, wherein the configuring of the off-chip passive device and matching network is performed so that the second differential port is power matched to the first differential port based on the different output port voltage reflection coefficients at the first differential port and associated with output differential signals at the different frequencies within the given bandwidth, wherein the configuring of the off-chip passive device and matching network results in a reduction in a power requirement for the chip, wherein the method further comprises iteratively repeating the designing of the chip and the designing of the package, and wherein the iteratively repeating comprises:

given the reduction in the power requirement for the chip, redesigning the chip by scaling device sizes, wherein the scaling of the device sizes results in new output port voltage reflection coefficients at the first differential port; and redesigning the package by reconfiguring the off-chip passive device and matching network so that the second differential port is power matched to the first differential port based on the new output port voltage reflection coefficients to ensure a same maximum forward voltage gain when an output differential signal has any of the different frequencies within the given bandwidth.

13. The method of claim 10, further comprising designing a chip module, wherein the designing of the chip module comprises:
designing a chip comprising the on-chip amplifier; and
designing a package for the chip such that the package comprises the off-chip passive device and matching network, wherein the on-chip amplifier comprises a low noise amplifier for any of a receiver and a receiver leg of a transceiver, wherein the configuring of the off-chip passive device and matching network is performed so that the second differential port is power matched to the first differential port based on different input port voltage reflection coefficients at the first differential port and associated with input differential signals at the different frequencies within the given bandwidth, wherein the configuring of the off-chip passive device and matching network results in a reduction in a power requirement for the chip, wherein the method further comprises iteratively repeating the designing of the chip and the designing of the package, and wherein the iteratively repeating comprises:

given the reduction in the power requirement for the chip, redesigning the chip by scaling device sizes, wherein the scaling of the device sizes results in new input port voltage reflection coefficients at the first differential port; and redesigning the package by reconfiguring the off-chip passive device and matching network so that the second differential port is power matched to the first differential port based on the new input port voltage reflection coefficients to ensure a same maximum reverse voltage gain when an input differential signal has any of the different frequencies within the given bandwidth.

14. The method of claim 10, wherein a difference between a high cut-off frequency and a low cut-off frequency of the given bandwidth is at least 5 GHz.

15. The method of claim 10, wherein the given bandwidth extends from approximately 77 GHz to approximately 83 GHz.

16. The method of claim 10, wherein the off-chip passive device and matching network are integrated within a balun.

17. The method of claim 10, wherein the off-chip passive device and matching network comprise any of a transformer and matching network and a phase shifter and matching network.

18. The method of claim 10, wherein the off-chip passive device and matching network are mounted on a substrate of a package.

19. The method of claim 10, wherein the off-chip passive device and matching network are mounted on an interposer that is mounted on a substrate of a package.

20. A system comprising:
a processor; and
a storage medium readable by the processor,
wherein the storage medium stores details of an on-chip amplifier of a chip,
wherein the on-chip amplifier has a first differential port associated with different voltage reflection coefficients for differential signals at different frequencies within a given bandwidth,
wherein the storage medium further stores program instruction,
wherein the program instructions are executable by the processor for performing a method, and
wherein the method comprises:
accessing the details of the on-chip amplifier; and
based on the details, configuring an off-chip passive device and matching network for a package for the chip, wherein the off-chip passive device and matching network has a second differential port electrically connected and power matched to the first differential port at the different frequencies within the given bandwidth.

* * * * *